United States Patent [19]

Feeman et al.

[11] Patent Number: 5,998,590
[45] Date of Patent: Dec. 7, 1999

[54] MAGENTA DYES HAVING FLOCCULATING PROPERTIES

[75] Inventors: James F. Feeman, Wyomissing, Pa.; Jing X. Sun, Lexington, Ky.

[73] Assignee: Lexmark International, Inc., Lexington, Ky.

[21] Appl. No.: 09/054,606

[22] Filed: Apr. 3, 1998

Related U.S. Application Data

[62] Division of application No. 08/690,467, Jul. 24, 1996, abandoned.

[51] Int. Cl.$^6$ .......................... C09B 44/08; C09B 44/04; C09B 44/00; C09B 47/32
[52] U.S. Cl. .......................... 534/603; 534/604; 534/605; 534/614
[58] Field of Search .................... 534/603, 604, 534/605, 614

[56] References Cited

U.S. PATENT DOCUMENTS

| | | | |
|---|---|---|---|
| 3,067,191 | 12/1962 | Meller et al. | 534/872 X |
| 3,674,783 | 7/1972 | Von Tobel | 534/702 X |
| 3,839,426 | 10/1974 | Jefferies et al. | 534/872 X |
| 3,852,029 | 12/1974 | Bolliger et al. | 8/4 R |
| 3,889,271 | 6/1975 | Freytag et al. | 346/1 |
| 3,954,392 | 5/1976 | Dien | 540/134 X |
| 4,533,920 | 8/1985 | Suzuki | 346/1.1 |
| 4,540,518 | 9/1985 | Eckhardt et al. | 540/134 X |
| 4,554,555 | 11/1985 | Aruga et al. | 346/1.1 |
| 4,565,688 | 1/1986 | Malin et al. | 540/134 X |
| 4,581,036 | 4/1986 | Opitz et al. | 8/527 |
| 4,648,993 | 3/1987 | Colberg et al. | 540/134 |
| 4,694,302 | 9/1987 | Hackleman et al. | 346/1.1 |
| 4,845,209 | 7/1989 | Adam | 540/132 |
| 4,963,189 | 10/1990 | Hindagolla | 106/22 |
| 5,025,271 | 6/1991 | Baker et al. | 346/140 R |
| 5,062,893 | 11/1991 | Adamic et al. | 106/22 |
| 5,106,416 | 4/1992 | Moffatt et al. | 106/20 |
| 5,156,675 | 10/1992 | Breton et al. | 106/22 |
| 5,160,372 | 11/1992 | Matrick | 106/19 R |
| 5,181,045 | 1/1993 | Shields et al. | 346/1.1 |
| 5,183,501 | 2/1993 | Kawashita et al. | 106/22 D |
| 5,196,056 | 3/1993 | Prasad | 106/15.05 |
| 5,198,023 | 3/1993 | Stoffel | 106/22 R |
| 5,207,824 | 5/1993 | Moffatt et al. | 106/22 R |
| 5,226,957 | 7/1993 | Wickramanayake et al. | 106/25 R |
| 5,320,668 | 6/1994 | Shields et al. | 106/20 R |
| 5,342,439 | 8/1994 | Lauw | 106/22 H |
| 5,342,440 | 8/1994 | Wickramanayake | 106/22 R |
| 5,364,461 | 11/1994 | Beach et al. | 106/22 R |
| 5,401,303 | 3/1995 | Stoffel et al. | 106/20 R |
| 5,428,383 | 6/1995 | Shields et al. | 347/96 |
| 5,476,540 | 12/1995 | Shields et al. | 106/20 R |

FOREIGN PATENT DOCUMENTS

| | | | |
|---|---|---|---|
| 0 765 388 | 10/1971 | Belgium | 534/615 |
| 0 633 142 A1 | of 0000 | European Pat. Off. | 106/22 R |
| 2 322 404 | 11/1974 | Germany | 534/615 |
| 0 446 578 | 3/1968 | Switzerland | 540/134 |

*Primary Examiner*—Floyd D. Higel
*Attorney, Agent, or Firm*—John A. Brady

[57] ABSTRACT

A flocculating dye reduces bleed between two inks when they are applied side by side. A first ink comprises the flocculating dye which flocculates the dispersant-pigment of the second ink.

3 Claims, No Drawings

MAGENTA DYES HAVING FLOCCULATING PROPERTIES

This application is a division of U.S. application Ser. No. 08/690,467, filed Jul. 24, 1996, now abandoned.

TECHNICAL FIELD

This invention is related to that disclosed in U.S. Pat. No. 5,735,941.

The present invention relates to novel compounds. The compounds may generally be classified as dyes and can be employed in ink compositions useful in ink jet printing. More particularly, the compounds may be classified as flocculating dyes which may be used to prevent color bleed in, for example, color ink jet printing systems.

BACKGROUND OF THE INVENTION

Ink jet printing is accomplished by ejecting ink from a nozzle toward paper or another print medium. The ink is driven from the nozzle toward the medium in a variety of ways. For example, in electrostatic printing, the ink is driven by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Preferably, an ink jet printer is capable of printing with colored ink, such as magenta, cyan and yellow, as well as black ink. When two colors are printed side by side, particularly when black ink is printed next to any other colored ink, the colors can "bleed" into one another. "Bleed" is defined as the migration of one ink color into a region of another ink color, particularly when black ink moves into a region of any other color. It is desirable to have a clean, crisp border between areas of two different colors. When one color bleeds into the other color, the border becomes irregular and ragged. Bleed is particularly undesirable when black ink is printed next to a light color ink, such as yellow.

Numerous methods have been developed in an attempt to reduce or eliminate the bleed between different colors of ink, particularly the bleed between black ink and colored ink.

One method to reduce bleed between inks is to incorporate one anionic ink and one cationic ink as disclosed in European Patent 633,142, Stoffel, et al., published Jan. 11, 1995. Both the anionic and cationic inks are aqueous solutions and contain a colorant which may be either a pigment or a dye. In one of the two inks, a polymer must be added which is of the same ionic character as the ink in which it is incorporated.

Cationic dyes are also disclosed in U.S. Pat. No. 5,198,023, Stoffel, issued Mar. 30, 1993. In this patent, a cationic yellow dye is used with an anionic black dye. Bleed is further reduced by adding a multivalent precipitating agent to the yellow ink. This multivalent precipitating agent is typically a multivalent salt, such as calcium chloride, magnesium chloride and aluminum chloride.

Bleed can also be alleviated by using pH sensitive dyes. U.S. Pat. No. 5,181,045, Shields, et al., issued Jan. 19, 1993, describes the use of a dye which is rendered insoluble by contacting it with another ink of the proper pH. This reaction occurs at the border of the two inks and is distinguished from systems where the pH of the paper is used to render the dyes insoluble. The pH of the second ink can be either higher or lower than that of the first ink. However, the pH difference should be greater than one unit. The '045 patent discloses dyes with proper pH. U.S. Pat. No. 5,320,668, Shields, et al., issued Jun. 14, 1994, which is a continuation in part of the '045 patent, discloses not only dyes but inks containing either pigments or dyes.

Color bleed is controlled by employing zwitterionic surfactants or ionic or non-ionic amphiphiles according to the teachings of U.S. Pat. No. 5,106,416, Moffat, et al., issued Apr. 21, 1992. The inks described contain one or more cationic dyes.

Bleed resistance is increased in dyes by counter-ion substitution in U.S. Pat. No. 5,342,439, Lauw, issued Aug. 30, 1994. A dye having one or more sulfonate or carboxylate groups is provided with a counter-ion comprising an amine, which is used for its surfactant properties. Such a dye is produced in an ionic exchange process.

The use of precipitating agents is taught in U.S. Pat. No. 5,428,383, Shields, et al., issued Jun. 27, 1995. Color bleed between two ink compositions is controlled by incorporating a precipitating agent in the second ink which precipitates the first ink coloring agent. When the two ink compositions contact each other on the paper, a precipitate is formed which prevents migration and color bleed problems.

In U.S. Pat. No. 4,694,302, Hackleman, et al., issued Sep. 15, 1987, the ink includes a reactive species which forms a polymer when the ink hits the paper. The reactive species either reacts with a component in the substrate, i.e., the paper, or alternatively reacts with a material which is applied to the substrate before the ink is applied.

U.S. Pat. No. 5,476,540, Shields, et al., issued Dec. 19, 1995, teaches the use of gel forming inks to alleviate bleed. In such a system, one ink contains a gel forming species and the other ink contains a gel initiating species, typically a protonated tertiary amine. When the two inks come in contact with each other, gel is formed, thereby preventing movement of the coloring agent.

Micro-emulsions comprising water insoluble black dyes are also used to prevent bleed between the black ink and the colored ink. Such inks are taught in U.S. Pat. Nos. 5,342,440, Wickramanayake, issued Aug. 30, 1994, and 5,226,957, Wickramanayake, et al., issued Jul. 13, 1993. In each case the black dyes are water insoluble. They are used in conjunction with colored inks that contain water soluble dyes. The water insoluble black dyes will not migrate through the water based color inks and, thus, bleed is prevented.

Bleed is also controlled by adding additional agents to the ink composition. For example, in U.S. Pat. No. 5,196,056, Prasad, issued Mar. 23, 1993, a bleed retarding agent which has a polar portion and a non-polar portion is added to the ink. A particularly preferred bleed retarding agent is 2-(2-butoxyethoxy)ethanol. In U.S. Pat. No. 5,160,372, Matrick, issued Nov. 3, 1992, an ester or amide diol is added to the ink to improve the penetration of the ink into the paper. This also provides rapid drying.

SUMMARY OF THE INVENTION

In a first aspect, the instant invention is directed to novel compounds. The use for the novel compounds is not limited; however, they are often employed as dyes in ink compositions. In this capacity, the dyes can act as flocculating dyes (defined below). This means they behave as a flocculent to an anionic pigment dispersion of a second ink composition in their proximity, thereby preventing color bleed. Additionally, these new compounds when employed in ink compositions unexpectedly provide an array of commercially desirable color choices not currently known, and they unexpectedly display superior lightfastness properties while simultaneously retaining waterfast and flocculent properties characteristic of dyes with cationic groups.

The compounds, which again may be employed as flocculating dyes, include those having the formulae represented below in the Detailed Description of the Invention. It is noted in the instant invention that wherever a cationic group is present, there will also be a counter anion present. Illustrative examples of such counter anions include monoalkyl sulfates as well as halides.

In a second aspect, the instant invention is directed to a novel method for making the above-described compounds.

DETAILED DESCRIPTION OF THE PREFERRED EMBODIMENTS

The instant invention is directed to novel compounds which may be employed as flocculating dyes. "Flocculating dye" is defined herein to mean a compound that 1) has at least one cationic functional group, i.e., a group that exhibits a positive charge, 2) is capable of flocculating an anionic pigment dispersion (second ink) in its proximity, and 3) exhibits sufficient solubility in water so that it may be used in an ink for ink jet printers.

The compounds of this invention are prepared, for example, by reactions including the halosulfonation, amine substitution and alkylation of phthalocyanine pigments. They may also be prepared, for example, by diazotization and coupling of intermediates containing cationic groups or amine groups which may be converted to cationic groups by alkylation. Furthermore, they may be prepared by conversion of selected reactive dyes to amphoteric dyes by reacting the dyes with selected amines and optionally alkylating to form pendant quaternary amine groups.

Suitable reactive dyes may include any of the dyes comprising the reactive functional groups found in the dye chemistry literature. Those containing mono- or di-chlorotriazine, vinylsulfone and/or sulfatoethylsulfone groups are preferred, wherein the reactive dyes may contain anionic groups. Illustrative examples of suitable reactive dyes which may be employed in this invention include C.I. Reactive Red 180 and C.I. Reactive Yellow 2.

In a preferred embodiment, however, the novel compounds of the instant invention comprise at least one cationic group and no anionic groups. Most preferably, they comprise more than one cationic group and no anionic group.

The compounds of the present invention, again, unexpectedly display superior color and lightfastness properties while simultaneously retaining their characteristic waterfast and flocculent properties. Such compounds may, for example, be classified as cyan, magenta and yellow dyes and they include those represented by the formulae hereinbelow.

The first novel compound of this invention is represented by the formula:

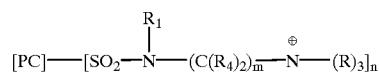

wherein m is about 0–6; n is about 2–4; each R is independently ($C_{1-4}$) alkyl, arylalkyl or hydroxyalkyl; PC is a metallic or non-metallic phthalocyanine group, wherein when a metallic group is present, it is preferably a transition metal such as Ni, but preferably Cu; $R_1$ is H or —$CH_3$; and each $R_4$ is independently H, ($C_{1-4}$) alkyl or hydroxyalkyl.

Preferably, the first novel compound is a cyan dye and selected from the group consisting of:

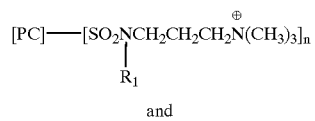

and

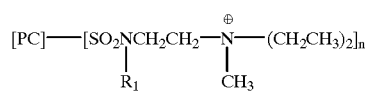

wherein $R_1$ is H or —$CH_3$ and n is about 3 or 4.

A second novel compound of this invention is represented by the formula:

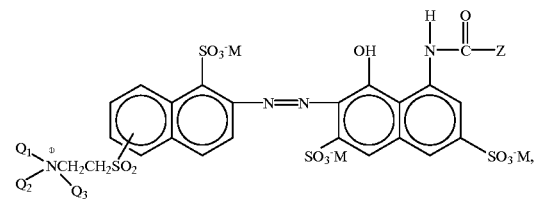

wherein $Q_1$ is hydroxyalkyl or

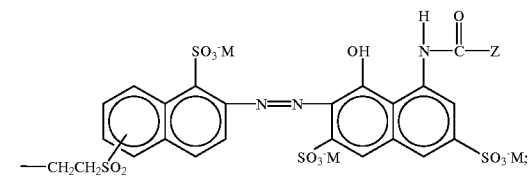

$Q_3$ is H or ($C_{1-4}$) alkyl;

each $R_2$ is independently H, lower ($C_{1-4}$) alkyl or hydroxyalkyl;

each M is independently $H^\oplus$, $Na^\oplus$, $K^\oplus$, $Li^\oplus$ or $N^\oplus(R_2)_4$; and Z is an aromatic, aliphatic, amine or alkoxy group.

Preferably, the second novel compound is a magenta dye selected from the group consisting of:

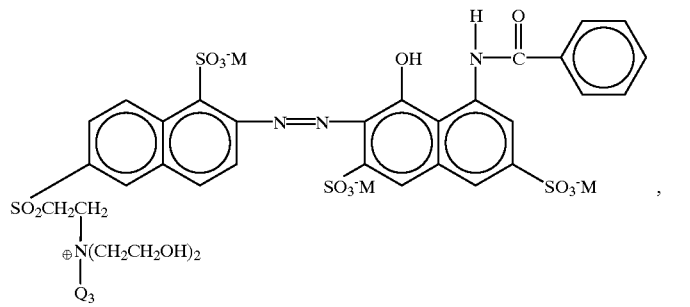
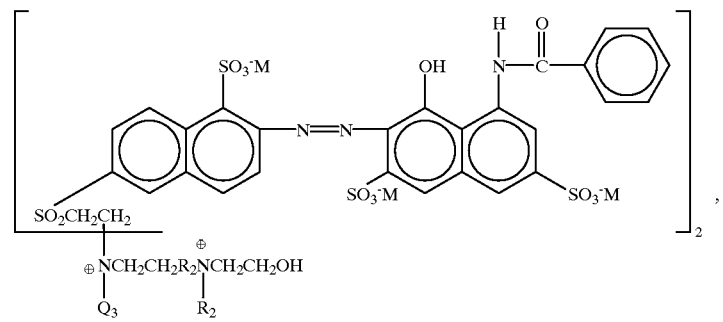
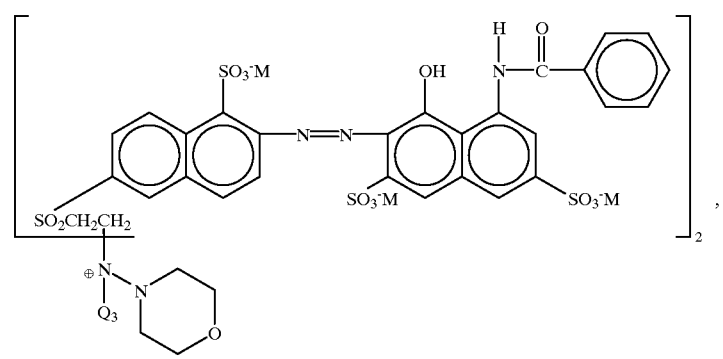
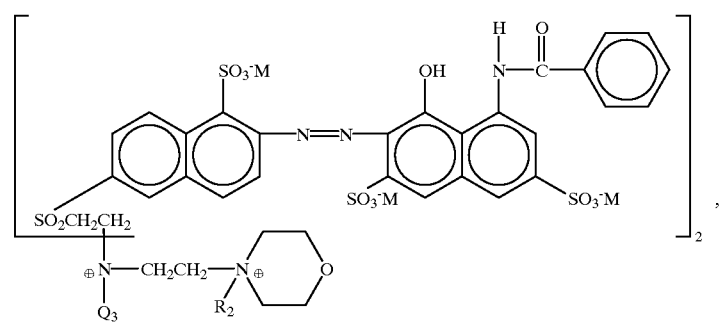
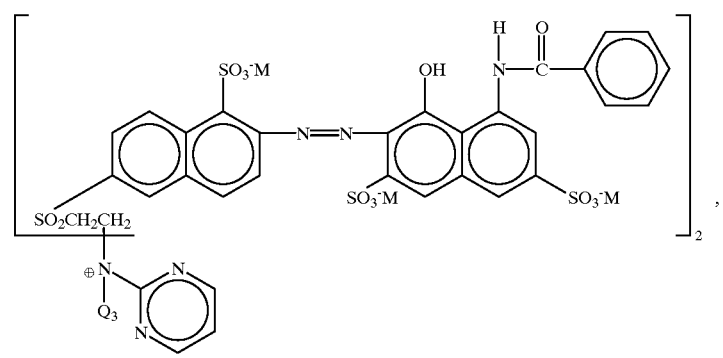

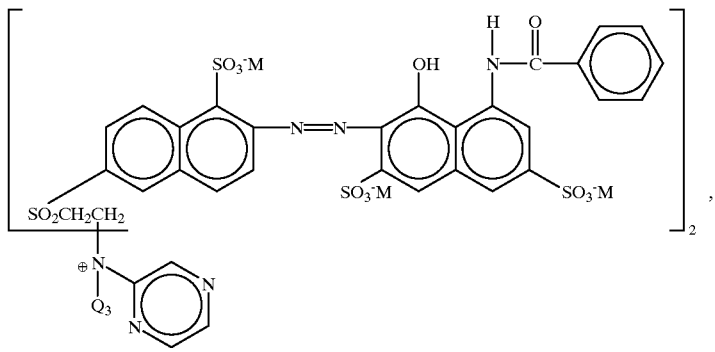
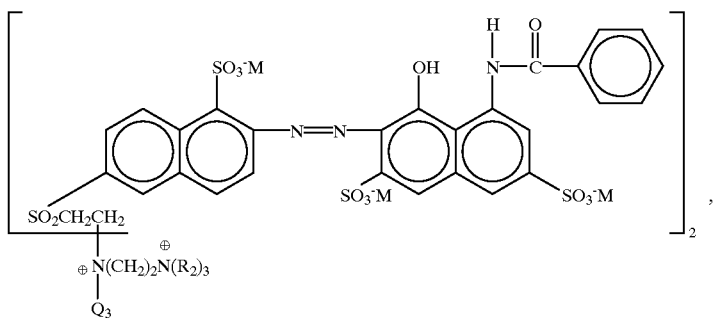
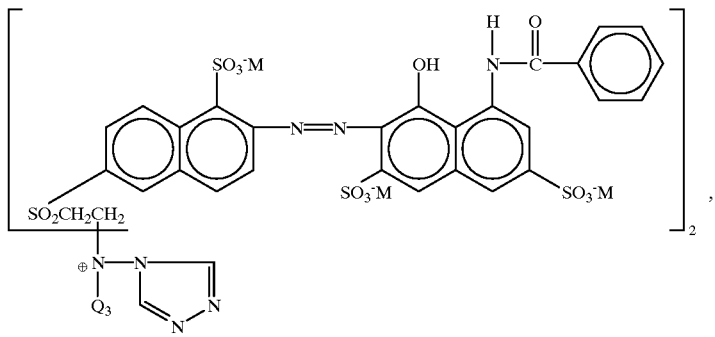
and
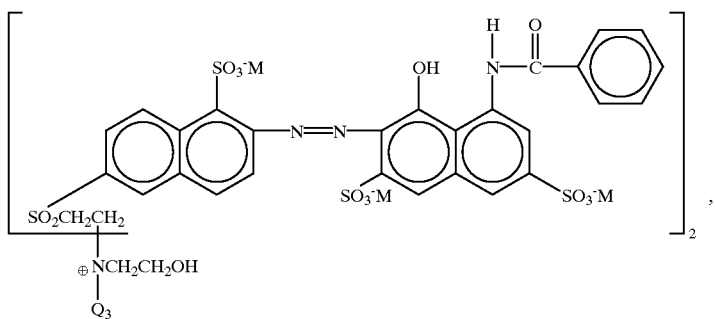
wherein M, $Q_3$ and $R_2$ are as previously defined.
Most preferably, the second novel compound is a magenta dye having the formula:

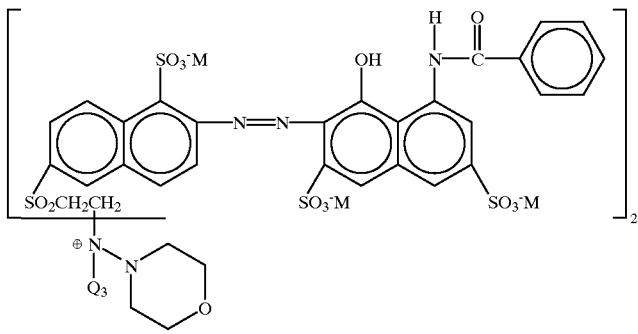

wherein M and $Q_3$ are as previously defined.

Additional novel compounds of this invention include compounds selected from the group consisting of:

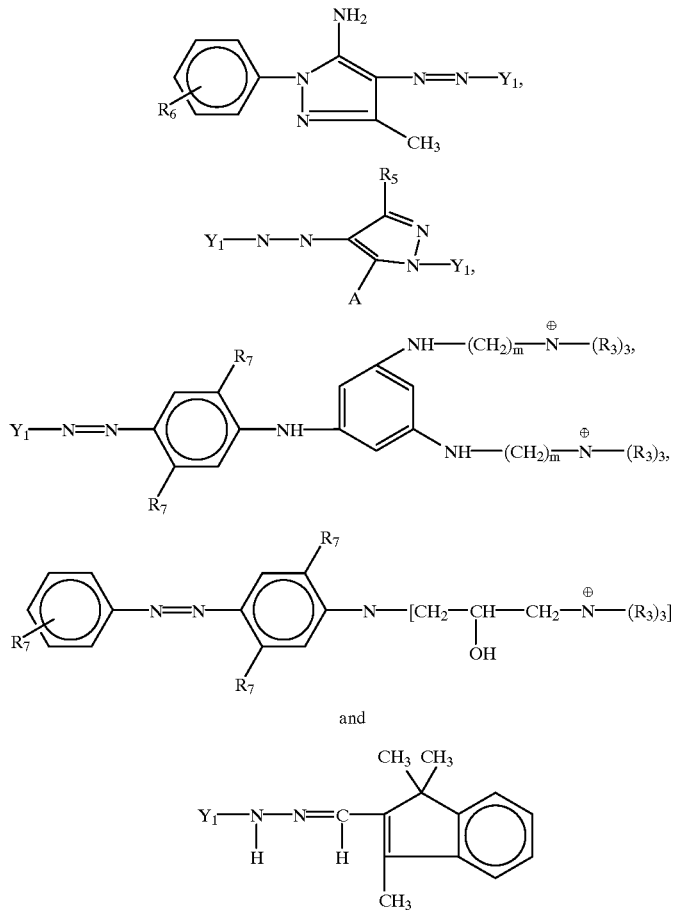

and wherein each m is about 0 to 6;
each R is independently lower ($C_{1-4}$) alkyl, arylalkyl or hydroxyalkyl;
$R_5$ is lower ($C_{1-4}$) alkyl or $CO_2M$;
$R_6$ is halogen, lower alkyl or lower alkoxyl;
each $R_7$ is independently H, lower alkyl or lower alkoxyl;
each $R_3$ is independently lower ($C_{1-4}$) alkyl or hydroxyalkyl;

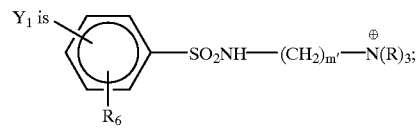

m' is about 0 to 6;
and A is —OH or —$NH_2$.

Preferably, the compounds are yellow dyes and selected from the group consisting of:
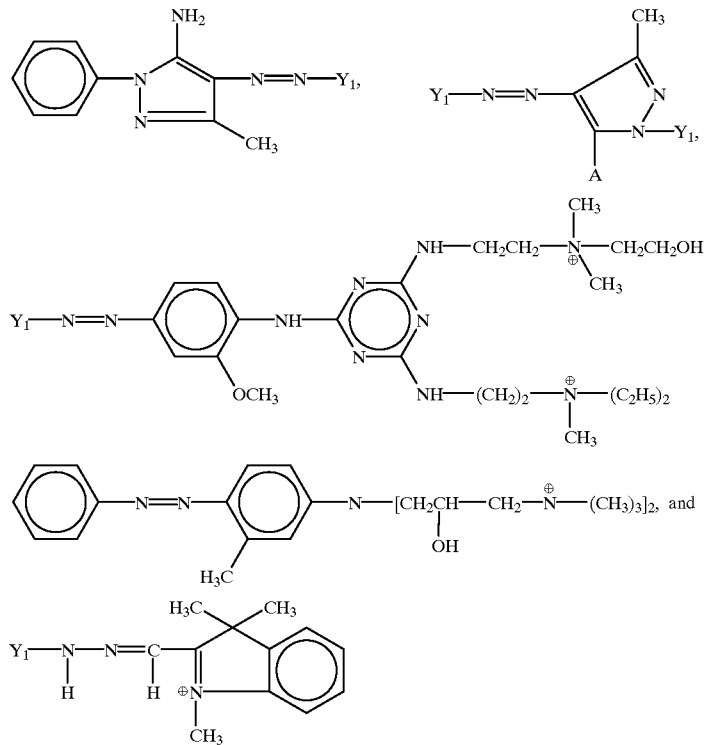
Still other novel compounds include those selected from the group consisting of:
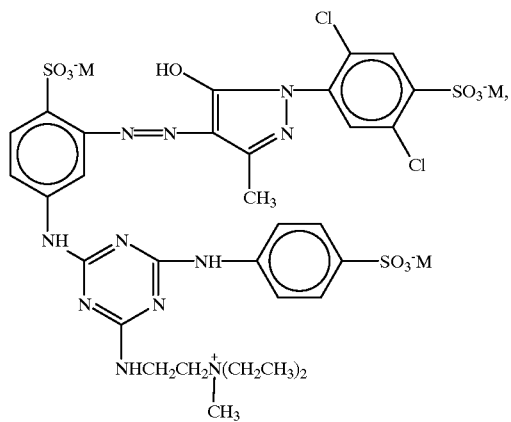
-continued
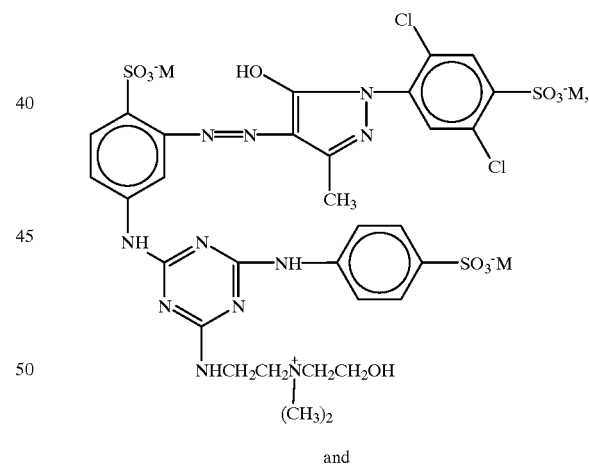
and -continued

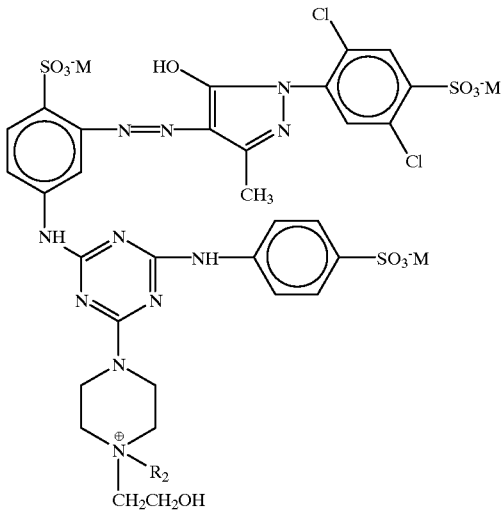

wherein each M is independently $H^\oplus$, $Na^\oplus$, $K^\oplus$, $Li^\oplus$ or $N^\oplus(R_2)_4$; and each $R_2$ is independently H, ($C_{1-4}$) alkyl or hydroxyalkyl, and wherein the compounds may generally be classified as yellow dyes often prepared from Reactive Yellow 2.

The reagents used to make the compounds of this invention are commercially available and/or conventionally made.

When preparing the novel compounds of this invention via a preferred and novel method, the dye is often dissolved in an aqueous solution and subsequently subjected to a desired amine which may also and preferably be dissolved in an aqueous solution. There is no limitation with respect to the order of which the resulting dye and amine solutions are combined other than that the combination allows for the formation of the desired novel compounds. When performing the preferred method, the amine solution is an aqueous amine solution which is added slowly, e.g., dropwise, to the aqueous dye solution. The resulting reaction mixture may be mixed to enhance the reaction between the dye and the amine. The mixing procedure is not limited and can include, for example, stirring, shaking as well as shear mixing.

There is no limitation with respect to how much of each of the two solutions are added to each other; however, it is often preferred that the moles of dye exceed the moles of amine. Preferably, the molar ratio of dye molecule to amine is no greater than about 2:1. In a most preferred embodiment, the molar ratio of dye molecule to amine is 2:1, the reactive dye is C.I. Reactive Red 180 and an additional step of alkylating the desired product is performed by adding a dialkyl sulfate to the reaction mixture.

When preparing the compounds of the instant invention, there is no limitation with respect to the reaction temperature. The reaction temperature may be ambient to elevated and the only temperature limitation is that the temperature is maintained at a level capable of allowing the desired compounds of this invention to be formed. The reaction temperature is preferably ambient when C.I. Reactive Red 180 is employed.

A novel method, therefore, for making the compounds described in this invention comprises the step of contacting:
(a) a reactive dye solution; and
(b) an amine solution,
wherein a molar ratio of dye to amine of no greater than about 2:1 is maintained.

The method may further comprise the step of mixing the dye and amine solution, and the mixing may be achieved by any conventional method, including those mentioned above.

The resulting product solution obtained from preparing the compounds of this invention can generally be used as is to make an ink composition. Optionally, the product solution can be purified to remove any inorganic salts and any other impurities. Preferably, the product solution is purified via ultrafiltration. Alternatively the product, a flocculating dye, can be isolated from solution and used to make an ink composition.

The following examples are detailed descriptions of methods of preparing the novel compounds. The detailed descriptions fall within the scope of, and serve to exemplify, the more general description set forth above. The examples are presented for illustrative purposes only, and are not intended as a restriction on the scope of the invention. The examples further describe the qualitative results when utilizing the instant novel compounds in inks.

EXAMPLE 1

The dye intermediate N'-(3-dimethylaminopropyl)-sulfanilamide having the structure:

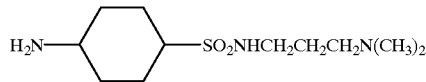

is prepared as follows: 3-dimethylaminopropylamine (105 g, 1 mole) is dissolved in 500 mL water, cooled with 500 g ice, and with good stirring treated with 239 g N-acetylsulfanilyl chloride during about 15 minutes. The pH is allowed to drop to 7 during another 10 minutes, when the mixture becomes viscous. The pH is raised to about 11.5 and maintained there by adding 50% sodium hydroxide solution (160 g) as required until the reaction is complete, resulting in complete solution. The temperature is allowed to rise to 20° C. After an additional hour during which a clear solution forms, hydrolysis of the acetyl group is effected by adding 100 g of 50% sodium hydroxide solution and heating at 90° C. for three hours. Cooling to room temperature, and neutralizing with hydrochloric acid to pH 9.5 gives an oily precipitate, which soon crystallizes. The product is collected, dried and recrystallized from isopropanol, giving a high yield of product having the desired structure as confirmed by NMR spectroscopy.

EXAMPLE 2

The yellow dye having the structure:

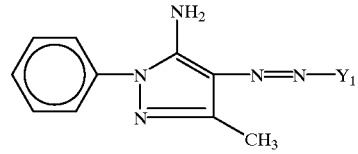

where $Y_1$ = 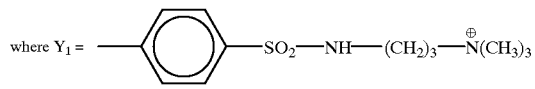

is prepared by diazotizing the intermediate prepared in Example 1 and coupling with 1-phenyl-3-methyl-5-aminopyrazole, then converting the dimethylamino group to trimethylarnrnonium by reaction of the resultant azo intermediate with dimethyl sulfate in aqueous solution. N'-(3-dimethylaminopropyl)-sulfanilamide (6.44 g) is dissolved in 25 nL water with 7 mL 37% hydrochloric acid, iced to 0° C.

and diazotized by adding a solution of 1.75 g of sodium nitrite in 5 mL water. Excess nitrite is removed with a small amount of sulfamic acid. To the stirring diazonium salt solution is added 4.4 g of 1-phenyl-3-methyl-5-aminopyrazole which is allowed to dissolve and couple. The reaction is diluted with 100 mL water and the pH slowly raised by dropping in 28 g 3N NaOH. The product precipitates but begins to redissolve as the pH rises. Further sodium hydroxide (50 g, 3N) is added, followed by 4 g dimethyl sulfate. A yellow solution forms. After stirring for 1 hour, the pH is lowered to 9.5 by addition of sodium bicarbonate and a yellow oily layer forms, which is separated by decanting. This is redissolved in deionized water (50 mL) with adjustment of the pH to 5.5. The volume is made up to 110 mL with water, giving an approximately 10% solution of a bright lemon-yellow cationic dye suitable for use in making inks for ink-jet printing. Prints prepared from ink made from this dye had excellent wet-fastness on paper.

EXAMPLE 3

Preparation of pyrazolone from N'-(3-dimethylaminopropyl)-sulfanilamide having the structure:

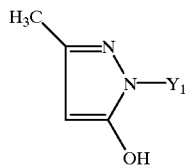

A solution of 0.2 g mole (51.5 g) of the intermediate prepared as in Example 1 in 215 mL water, is iced to 0° C., and stirred in an ice bath. Hydrochloric acid (95 mL, 37%) is added followed by a solution of 14 g of sodium nitrite. After stirring for ten minutes with a slight excess of nitrite present, the excess is removed with sulfamic acid. The diazonium salt solution is neutralized to pH 6 by sifting in 28 g of sodium bicarbonate at 0° C. During 15 minutes, 25.2 g of sodium sulfate is sifted in, and the pH rises to 9.4. To the bright orange colored solution, after 30 minutes and at <5° C., is added 22 g sodium bisulfite during 10 minutes. The solution is pale yellow and diazo nearly disappears. Colorless crystalline precipitate begins to form. The reaction is then stirred an additional two hours, heated to 75° C. and 70 g 37% hydrochloric acid is added. The temperature is increased to 90–95° C. and held for four hours with sulfur dioxide evolving. The solution is stirred and cooled overnight. Sodium hydroxide (55 g, 50%) is added to pH 6. Ethyl acetoacetate (26 g; 0.2 mole) is added at 35° C. Heating to the boiling point, and acidification with hydrochloric acid (20 mL) gives a yellow tarry precipitate. After 2 hours, sodium hydroxide (90 g; 50%) is added and the reaction is heated again to 95° C. to hydrolyze excess ethyl acetoacetate. Upon cooling the solution is filtered from salt, which separates. The filtrate is neutralized with acetic acid to pH 6. Pink tar separates and is isolated by decanting. It redissolves readily in water at pH 7 as a pale pink solution, useful as a coupler for making cationic azo dyes. $Y_1$ is as defined in Example 2.

EXAMPLE 4

The yellow dye having the structure:

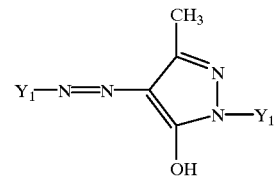

is prepared by diazotizing 0.05 g mole of the intermediate from Example 1, as in Example 2, and adding the diazonium salt solution to a solution of 0.05 mole of pyrazolone coupler prepared as in Example 3. The pH of the coupling mixture is slowly raised to 10. At pH 8 to 10, the product, a yellow monoazo dye intermediate, is completely precipitated. It redissolves completely at pH 12. Methylation by addition of two equivalents of dimethyl sulfate and subsequent neutralization to pH 7, gives a solution of bright yellow cationic dye suitable for use in making inks for ink-jet printing, the prints having very good wet-fastness on paper. $Y_1$ is as defined in Example 2.

EXAMPLE 5

Synthesis of the dye intermediate having the structure:

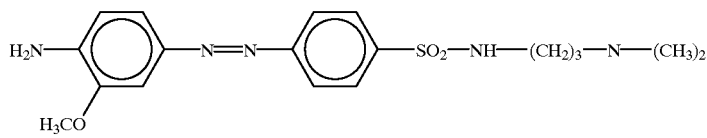

Intermediate prepared as in Example 1 (0.2 mole, 51.5 g) is dissolved and diazotized as described in Example 3. The pH of the diazo is raised to 4.0 by adding 16 g sodium bicarbonate at 0° C. A solution of 0.21 mole of o-anisidinomethane-sulfonic acid (prepared by reaction of formaldehyde-bisulfite adduct with o-anisidine in known manner) is added keeping the pH at 4–5 by adding 24 g sodium bicarbonate and temperature at 0–5° C. After stirring for 16 hours the diazo is all coupled. The pH is raised to 11 by adding 40 g sodium hydroxide (50%). Solid sodium hydroxide (45 g) is added to the solution and the reaction is heated at 90–95° C. for one hour. A tarry brown precipitate forms, which is isolated after cooling and redissolved in water at 800 mL volume. Salting 15% on volume with sodium chloride and stirring gives a crystalline product, which is filtered. The cake is redissolved in water, the pH raised to 11, Darco (<100 mesh, 3 g) and Filtercel (4 g) added, and the solution filtered. This intermediate is useful for preparing cationic yellow dyes.

EXAMPLE 6

Preparation of bis-cationic yellow dye having the structure:

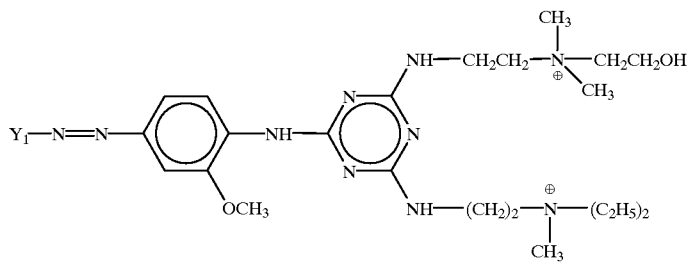

is prepared by reaction in usual manner of the intermediate prepared in Example 5 with cyanuric chloride; and the resultant product is reacted sequentially with N'-(2-diethylamino)ethylamine, aminoethylethanolamine, and dimethyl sulfate. The dye is suitable for preparation of yellow inks for inkjet printing, the prints obtained having excellent light- and wet-fastness properties. $Y_1$ is defined as in Example 2.

EXAMPLE 7

Preparation of yellow bis-cationic dye having the structure:

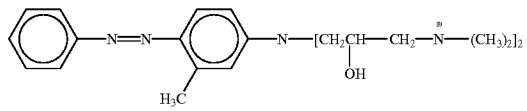

m-Toluidine (0.1 mole, 10.83 g), 3-chloro-2-hydroxypropyl-trimethylammonium chloride (66 g), isopropanol (60 g) and 25 g sodium carbonate were heated together under reflux for 3 hours until evolution of carbon dioxide stopped. The solution is filtered from inorganic salts, 100 mL of water added to the filtrate, and the isopropanol removed by distillation at reduced pressure. The resultant solution (107.5 g) is useful in preparing dyes having two pendant cationic groups which confer high solubility and excellent wet-fastness properties.

Aniline (0.05 mole) is diazotized in the conventional manner and added to 59 g of the solution of the intermediate prepared above which is iced to 0° C. The pH of the coupling is raised slowly to 6.1 by sifting in, with good stirring, 7 g of sodium bicarbonate. After stirring for some hours, the diazo is all gone, and the reaction is a reddish-yellow solution (262 g) containing about 8.5% solids. This is subjected to ultrafiltration, to remove inorganic salts. It is found useful for preparation of yellow inks for ink-jet printing, the prints having excellent wet-fastness and good light-fastness properties.

In this example when the m-toluidine is replaced with an equivalent amount of aniline, otherwise proceeding in a similar manner, a yellow cationic dye is obtained having similar properties. Also, when the m-toluidine is replaced with an equivalent amount of o-anisidinel, otherwise proceeding in a similar manner, a yellow cationic dye is obtained having similar properties.

When, in this example, the diazotized aniline is replaced with a molar equivalent amount of, for example, another aromatic amine such as o-, m-, or p-toluidine, o-, or p-anisidine, o-, or p-phenetidine, m-chloroaniline, etc., yellow cationic dyes are obtained having similar properties.

EXAMPLE 8

Preparation of yellow cationic dye having the structure:

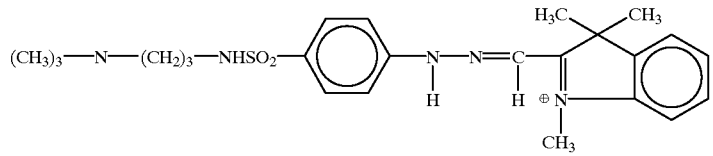

N'-(3-dimethylaminopropyl)-sulfanilamide (0.025 mole) is diazotized according to the procedure given in Example 2. To the diazonium salt solution is added dropwise 4.2 g of Fischer's Base (i.e., 2,3,3-trimethylindolenine) dissolved in 10 g acetic acid. The coupling is stirred for one hour, then neutralized slowly, first with 7 g sodium bicarbonate, then with 12% sodium hydroxide solution to raise the pH finally to 11.5. The yellow, water-soluble product tars out, and is isolated by decanting the aqueous layer. The residue is dissolved in 100 mL of deionized water, treated with Darco and Filtercel and clarified. To the filtrate is added 7 g dimethyl sulfate. The pH is kept at about 6–7, until the pH stabilized, using 11.5 mL 12% sodium hydroxide. The reaction is stirred for 16 hours (pH 6.5) giving approximately 5.5% bright yellow solution of the cationic dye, which is useful for making yellow inks for ink-jet printing, the prints having good wet-fastness.

EXAMPLE 9

0.01125 mol C.I. Reactive Red 180 (purified for ink-jet use) is dissolved in 250 mL of de-ionized water. 0.01125 mol diethanolamine is then added dropwise. After addition, the temperature of the mixture is raised to 50° C., and the pH of the mixture is kept at 7.5 by dropping in 2N NaOH. The reaction is carried out under these conditions for 18 hours, then cooled to room temperature. Dropwise addition of an equimolar amount of dimethyl sulfate while keeping the pH at 7–8 by addition of 2N NaOH alkylated the N atoms to form quaternary N groups.

A dye of the following structure results:

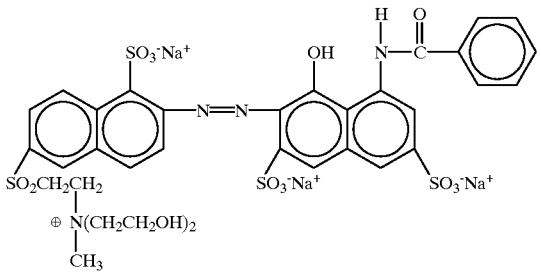

EXAMPLE 10

0.0225 mol C.I. Reactive Red 180 (purified for inkjet use) is dissolved in 250 mL of de-ionized water. 0.01125 mol 2-(2-aminoethylamino)ethanol is then added dropwise. After addition, the temperature of the mixture is raised to 50° C., and the pH of the mixture is kept at 7.5 by dropping in 2N NaOH. The reaction is carried out under these conditions for 18 hours, then cooled to room temperature. Dropwise addition of an equimolar amount of dimethyl sulfate while keeping the pH at 7–8 by addition of 2N NaOH alkylated the N atoms to form quaternary N groups.

A dye of the following structure results:

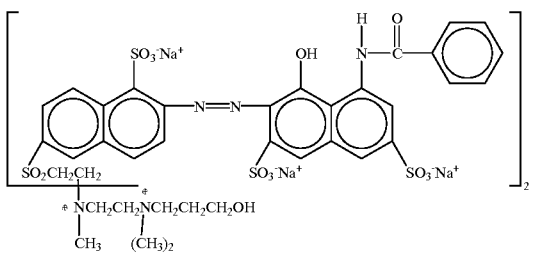

EXAMPLE 11

The compound in example 11 was prepared in a manner similar to the one described in example 10 except that 4-aminomorpholine was used in lieu of 2-(2-aminoethylamino)ethanol.

A dye of the following structure results:

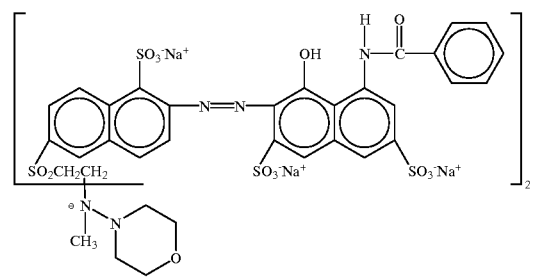

EXAMPLE 12

The compound in example 12 was prepared in a manner similar to the one described in example 10 except that 4-(2-aminoethyl)morpholine was used in lieu of 2-(2-aminoethylamino)ethanol.

A dye of the following structure results:

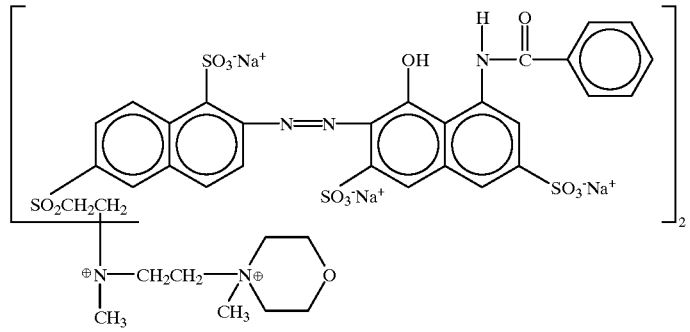

EXAMPLE 13

The compound in example 13 was prepared in a manner similar to the one described in example 10 except that 2-aminopyrimidine was used in lieu of 2-(2-aminoethylamino)ethanol.

A dye of the following structure results:

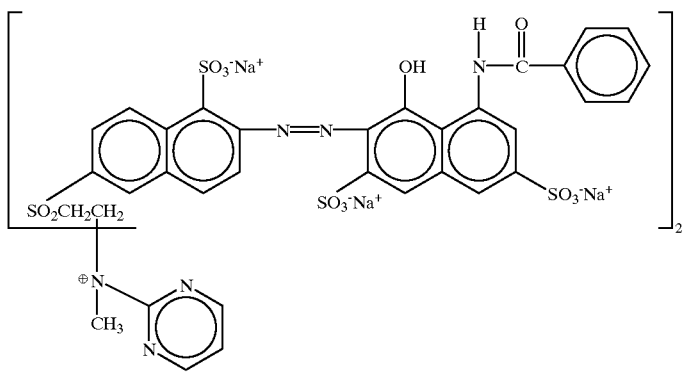

EXAMPLE 14

The compound in example 14 was prepared in a manner similar to the one described in example 10 except that aminopyrazine was used in lieu of 2-(2-aminoethylamino) ethanol.

A dye of the following structure results:

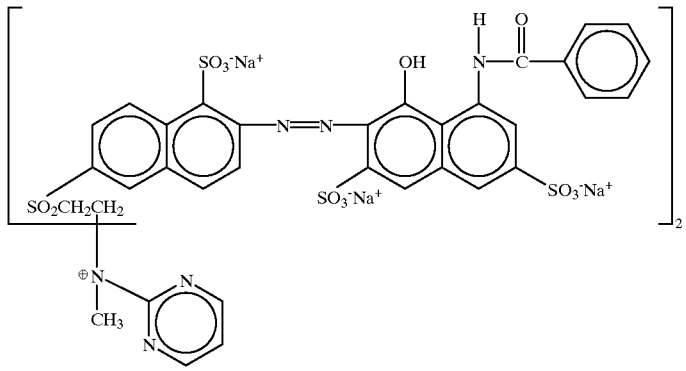

EXAMPLE 15

The compound in example 15 was prepared in a manner similar to the one described in example 10 except that 3-dimethylaminopropylamine was used in lieu of 2-(2-aminoethylamino)ethanol.

A dye of the following structure results:

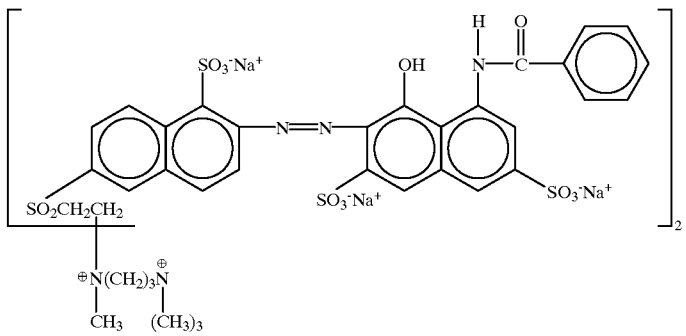

EXAMPLE 16

The compound in example 16 was prepared in a manner similar to the one described in example 10 except that 4-amino-1,2,4-triazole was used in lieu of 2-(2-aminoethylamino)ethanol.

A dye of the following structure results:

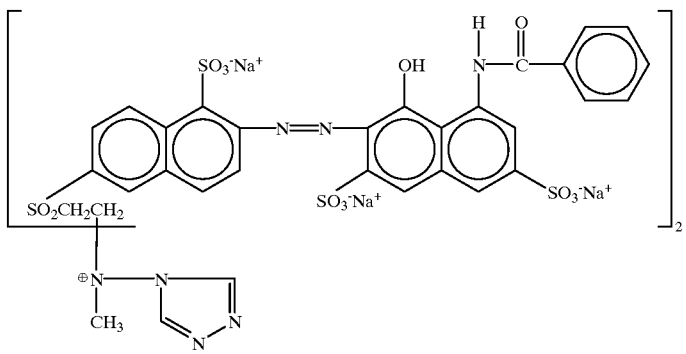

EXAMPLE 17

The compound in example 17 was prepared in a manner similar to the one described in example 10 except that ethanolamine was used in lieu of 2-(2-aminoethylamino) ethanol.

A dye of the following structure results:

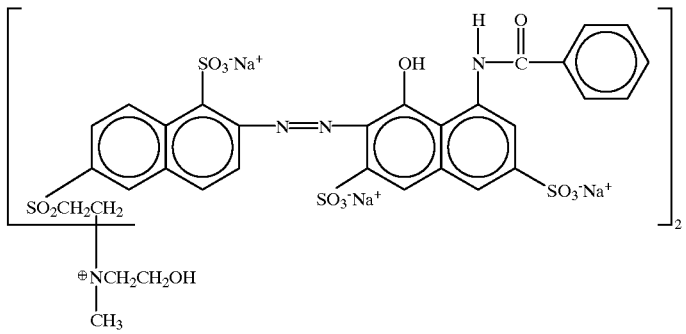

EXAMPLE 18

0.01125 mol C.I. Reactive Yellow 2 (purified for ink-jet use) is dissolved in 250 mL of de-ionized water, 0.01125 mol diethylaminoethylamine is added dropwise. After addition, the temperature of the mixture is raised to 70° C., and the pH of the mixture is kept at 8 by dropping in 2N NaOH. The reaction is carried out under these conditions for 18 hours, then cooled to room temperature. Dropwise addition of an equimolar amount of dimethyl sulfate while keeping the pH at 7–8 by addition of 2N NaOH alkylated the N atoms to form quaternary N groups.

A dye of the following structure results:

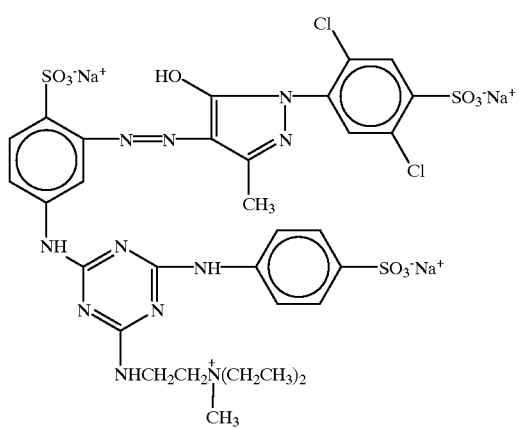

EXAMPLE 19

The compound in example 19 was prepared in a manner similar to the one described in example 18 except that 2-(2-aminoethylamino)ethanol was used in lieu of diethylaminoethylamine.

A dye of the following structure results:

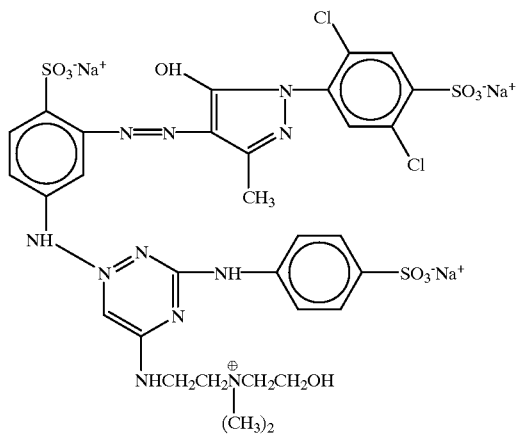

EXAMPLE 20

The compound in example 20 was prepared in a manner similar to the one described in example 18 except that 1-(2-hydroxyethyl)piperazine was used in lieu of diethylaminoethylamine.

A dye of the following structure results:

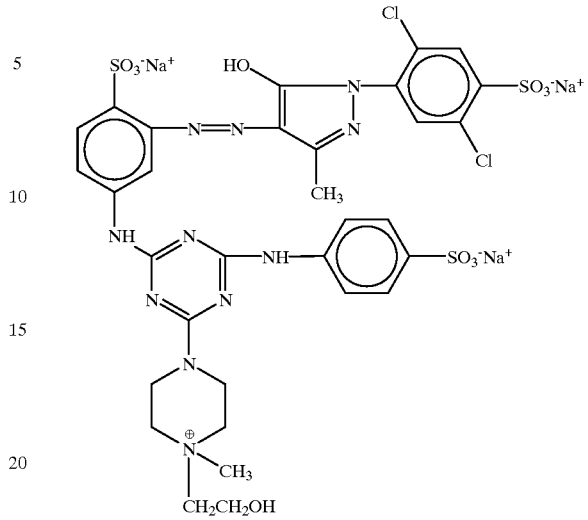

EXAMPLE 21

Copper phthalocyanine (11.5 g, 0.019 moles) is chlorosulfonated in a known manner. (cf. The Chemistry of Synthetic Dyes, vol. VI, pp. 312–323; K. Venkataraman, Ed., Academic Press, New York and London, 1972). After drown-out and icing, the paste of copper phthalocyanine tetrasulfonyl chloride (73 g) is repasted with 200 g of ice.

N,N-diethylethylenediamine (9.3 g, 0.079 moles) is mixed with 50 g of ice, and is stirred well. The paste of CPC tetrasulfonyl chloride is added in a thin stream. The mixture is stirred 16 hours during which the pH drops from 12 to 8. The precipitated product is filtered. The filter cake is redissolved in 50 mL deionized water and sufficient 2N sodium hydroxide to give complete solution at a pH of 10–11. Dimethyl sulfate (10 g, 0.079 moles) is then added dropwise at pH of 10. The pH is maintained by adding 2N sodium hydroxide as required with stirring. After the pH is has stabilized at 10, the solution is purified by ultrafiltration. The product has the structure:

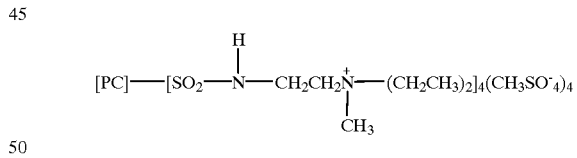

EXAMPLE 22

Using the method of Example 21, but substituting an equimolar amount of 3-dimethylaminopropylamine in place of the N,N-diethylethylenediamine, the following dye molecule is produced:

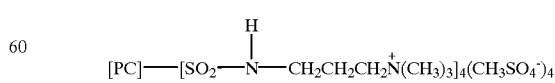

EXAMPLE 23

A control ink was prepared using commercial basic dye, C.I. Basic Red 15 (all percentages are by weight based on total weight of the ink).

| | |
|---|---|
| 2% | C.I. Basic Red 15 |
| 15% | 2,2-Thiodiethanol (humectant) |
| 6% | 1,2-Hexanediol (penetrant) |
| 0.1% | Proxel™ GXL (Biocide) |
| 76.9% | DI Water |

The components were added together and stirred thoroughly. The pH was maintained at 5 by adding glycolic acid and/or NaOH.

A Lexmark® Ink Jet Cartridge was charged with the resulting control ink and inserted in a Lexmark WinWriter® 150C printer. The resulting plain paper printed images were exposed to a Xenon Arc Fadometer for about 24, 48, and 72 hours. After about 72 hours, the paper printed images essentially disappeared (DE determined by CIE Lab Values was approximately 70).

EXAMPLE 24

Example 24 was conducted in a manner similar to the one described in example 23 except that the dye in example 9 was used to produce a first ink in lieu of C.I. Basic Red 15. After about 72 hours of Xenon Arc Fadometer exposure, the resulting plain paper printed images clearly appeared (DE determined by CIE Lab Value was approximately 10). After comparing the color of the paper printed images in examples 23 and 24 (after 72 hours), the images in example 24 (based on qualitative observations) displayed a higher color value/saturation than the images prepared in example 23. This indicates that the novel compounds (when employed in ink compositions) retained a large array of colors and gave superior lightfastness properties when compared to conventional commercial dyes.

EXAMPLE 25

The paper printed image made in example 24 was sprayed with water. Based on qualitative observations, the printed image washed/spread in a manner consistent with images made from inks comprising cationic dyes. This qualitative test indicated that the waterfast properties of the instant novel compounds were consistent with conventional cationic dyes.

EXAMPLE 26

A Lexmark Ink Jet Cartridge similar to the one prepared in example 24 (first ink) and a commercially available second ink cartridge (anionic carbon black pigment dispersion) were applied side by side using a Lexmark WinWriter 150C Printer. The results demonstrating the flocculating properties of the novel compounds prepared in this invention may described as follows in the following illustration:

A commercially available anionic carbon black pigment ink dispersion and the control magenta ink of Example 23 were printed side by side. Visual analysis/inspection of the resulting print sample revealed that bleeding/migration between the two inks took place. The bleeding/migration was confirmed because letters of the print sample did not have clean and sharp edges.

A commercially available anionic black ink pigment dispersion and the magenta ink of Example 24 were printed sided by side. Visual analysis/inspection of the resulting print sample revealed that bleeding/migration between the two inks did not take place. The lack of bleeding/migration was confirmed because letters of the print sample did have clean and sharp edges.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A flocculating dye of the structural formula:

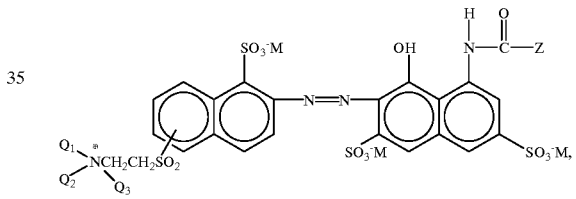

wherein $Q_1$ is hydroxyalkyl or

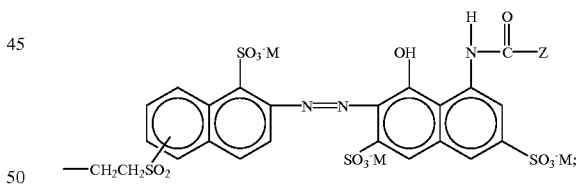

Q3 is H or $(C_{1-4})$ alkyl; each $R_2$ is independently H, $(C_{1-4})$ alkyl or hydroxyalkyl; each M is independently $H^\oplus$, $Na^\oplus$, $K^\oplus$, $Li^\oplus$ or $N^\oplus (R_2)_4$; and Z is a phenyl group.

2. A flocculating dye of structural formula selected from the group consisting of:

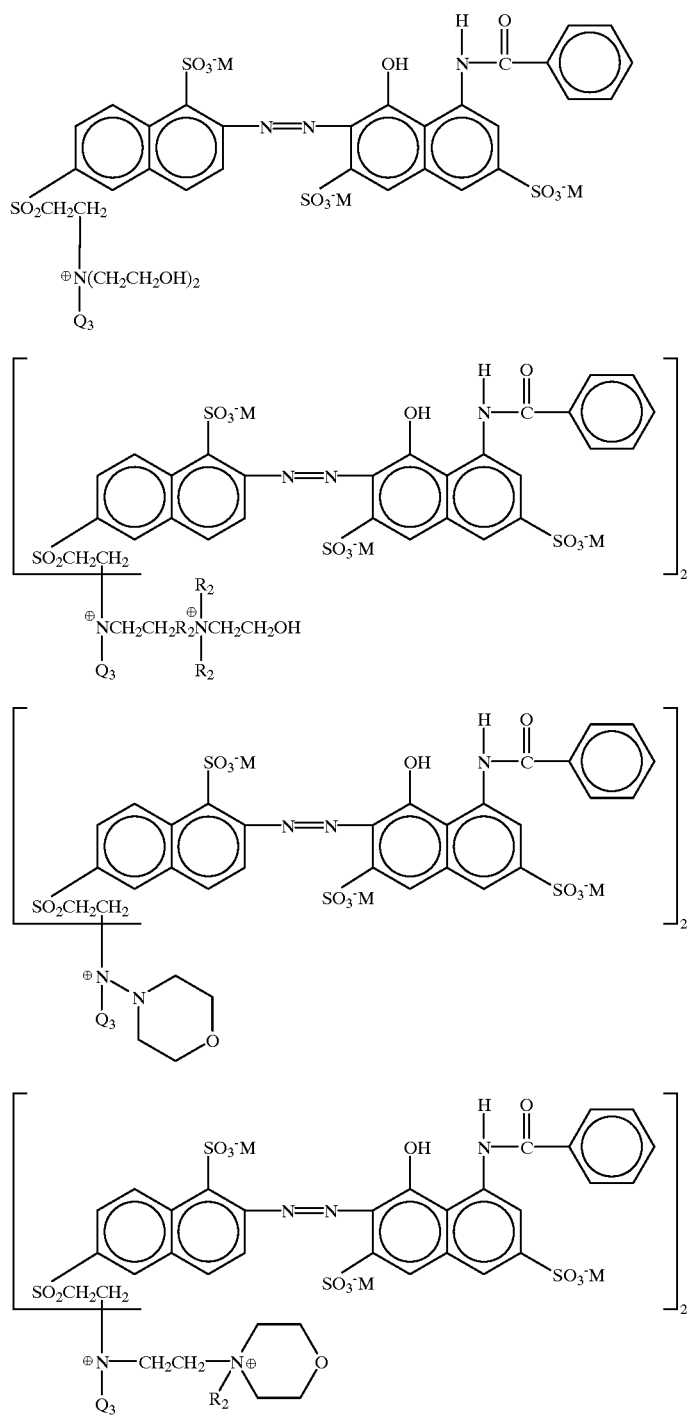

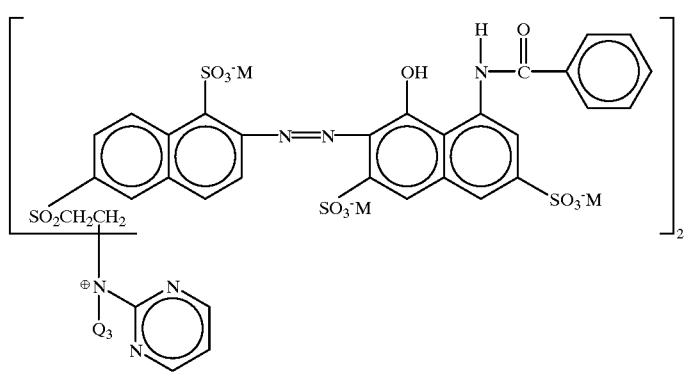
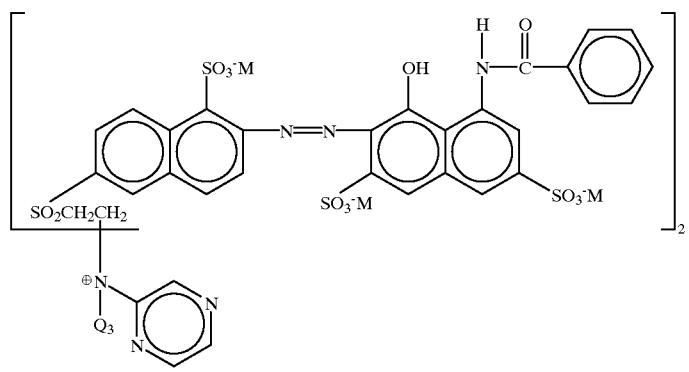
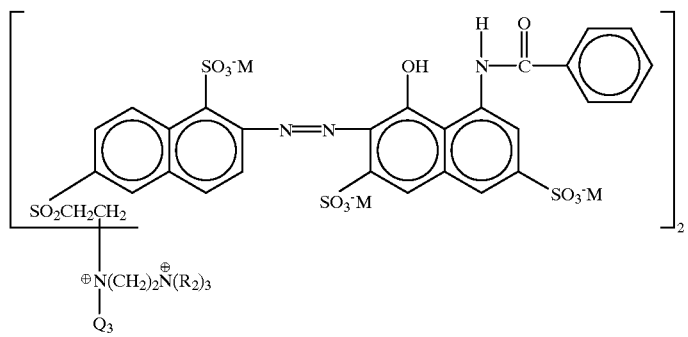
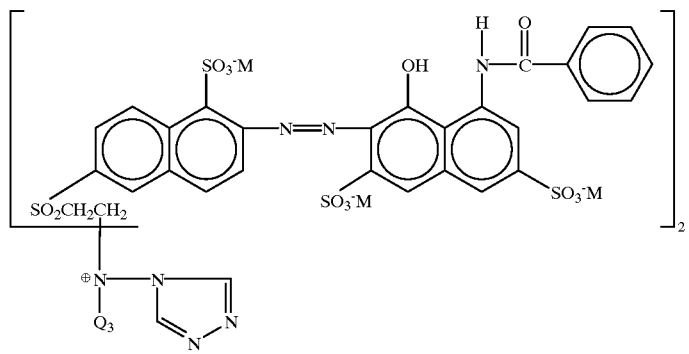
and

-continued
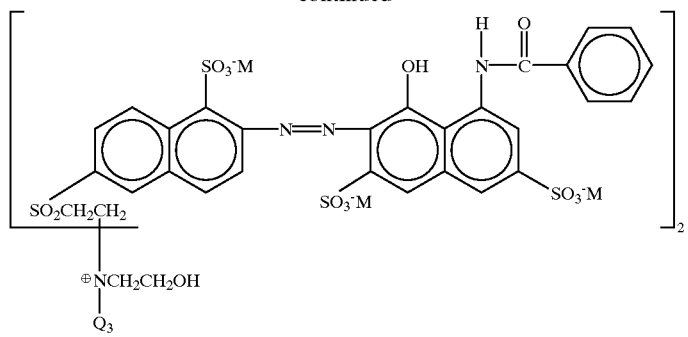
wherein $Q_3$ is H or $(C_{1-4})$ alkyl; each $R_2$ is independently H, $(C_{1-4})$ alkyl or hydroxyalkyl; and M is independently $H^\oplus$, $Na^\oplus$, $K^\oplus$, $Li^\oplus$ or $N^\oplus(R_2)_4$.
3. The flocculating dye of claim 2, wherein M is $Na^\oplus$, $Q_3$ is H or —$CH_3$ and $R_2$ is H or —$CH_3$.
* * * * *